Patented May 3, 1927.

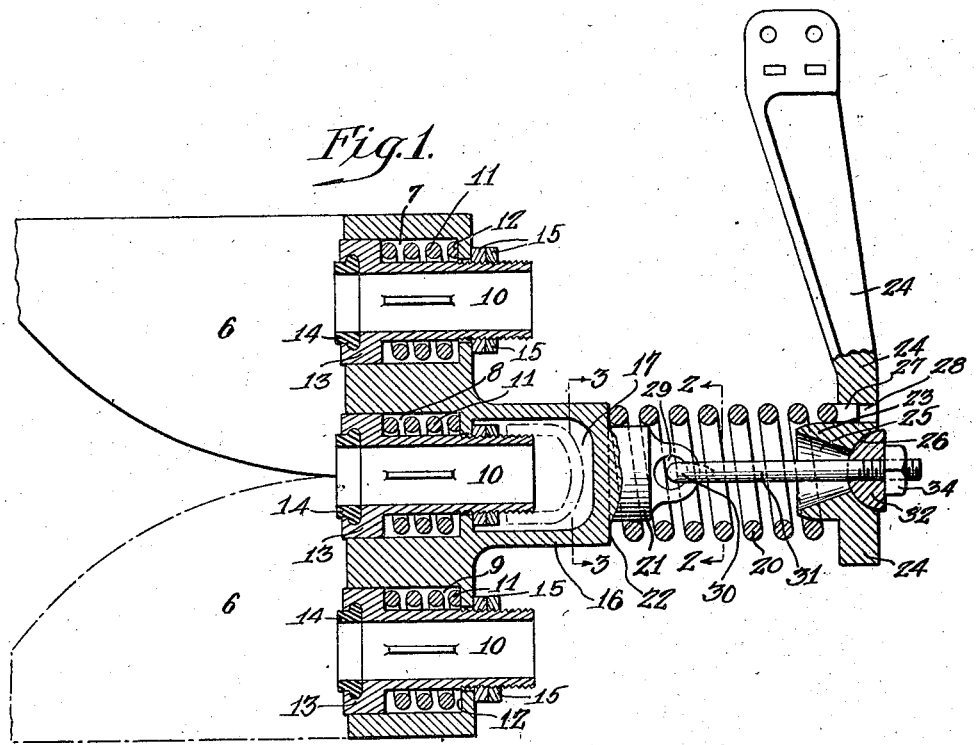

1,626,696

UNITED STATES PATENT OFFICE.

EDWARD A. ROBINSON, OF MONTREAL, QUEBEC, CANADA, ASSIGNOR OF ONE-HALF TO HIMSELF AND ONE-HALF TO ELLISON E. WORKMAN, OF MONTREAL, CANADA.

CONNECTER-HEAD SUPPORT.

Application filed May 17, 1922. Serial No. 561,708.

My invention relates to supports for the heads of automatic train connecters.

The purpose of my invention is to improve the connection between the head and the bracket, simplifying it and at the same time securing a maximum of flexibility to required movement.

A further purpose is to so connect the head and yoke with the bracket that the head will swing about a point nearly midway between the head and bracket and also about the bracket as a center turning equally in all directions and attaining the benefits of these movements individually and a composite benefit from the automatic combination of these movements.

Further purposes will appear in the specification and in the claims.

I have preferred to illustrate my invention by but one form, selecting a form which is simple, practical, efficient, and inexpensive, which employs a minimum number of parts and which at the same time well illustrates the principles of my invention.

Figure 1 is a vertical longitudinal section through a train connecter head and supporting mechanism but with part of the bracket in elevation.

Figures 2 and 3 are sections of Figure 1 taken upon lines 2—2 and 3—3 respectively.

On account of the rough usage which train connecters receive it is very desirable to have them in as simple a form and of as rugged construction as possible. The variation of position required of the head, both vertically and horizontally, to correct for differences in car-loading, curves, etc., places a premium upon smoothness and ease of movement of the head with respect to the point of support, and has led to the production of the construction shown.

Describing the form shown in illustration but not in limitation:—

The head is provided with the usual ears or horns 6, and is apertured at 7, 8 and 9 to receive train pipe terminal tubes 10 upon which may be mounted fittings for connection with train pipes. The terminals are surrounded by springs 11. At the rear the openings are internally flanged, integrally or otherwise, to form the shoulders 12 against which the springs 11 bear at the rear. At the front they bear against enlargements 13. Gaskets 14 are shown within the tubes.

The terminal tubes are held against excessive projection by threaded collars 15 mounted upon threads of approximately uniform diameter upon the tubes, on which the collars may therefore be adjusted to adjust the tube projection and may be locked by lock nuts if desired. The threads at the ends of the tubes are preferably tapered to make tight joints with the fittings. The structure as so far described, though my invention, is not intended to be separately claimed in this application.

About the center of the head I place a yoke-like hollow rear yoke support 16, preferably cast integral with the head and spanning the central tube but open at the side at 17 to provide for attachment to this central tube of a suitable fitting and proper connection to it through the openings in the yoke from a car train pipe. I have dotted such a fitting into Figure 1 though I have not included this in the section.

The yoke support 16 is notched at 18 to receive and position turned end 19 of the buffer spring 20. This spring surrounds a projection 21, upon the rear of the yoke support and bears against the flange 22 of the support.

The opposite end of the spring 20 surrounds a flange 23 rigid with the bracket 24. The interior of this projection is flared forwardly at 25 and the bracket is apertured and is provided with a rearwardly facing spherical seat 26 about the aperture. The spring at this end terminates in a rearwardly turned end 27 which fits into a perforation 28 in the bracket.

An eye 29 upon the rear of the projection 21 affords a hold for a hook 30 upon a bolt 31 which passes through the opening in the bracket and through a spherical member 32 resting in the spherical seat 26. This member may be a nut or a washer, and, even if itself a nut, may be used with a nut 34. The bolt is tightened and held by means of one or more nuts, as indicated and places the spring 20 under the desired compression. At the same time the spring maintains the head normally in the position shown while it is free to move in all directions, swinging about the hook or about the spherical seat. In the latter case the member 32 turns against the seat, and in either case there is a strong tendency to return to its initial position.

In assemblage the spring is placed in position about the head projection and with the eye bolt within the spring. The parts are then connected with the bracket so that the end 27 fits within the opening in the bracket at 28 and the spring surrounds the part 23. In the meantime the bolt is passed through the bracket so that the nut or nuts, with or without a washer may be applied, first to hold the parts in assembled position and subsequently to secure the desired compression in the spring.

The intermediate pivotal point, spaced well from the head by the yoke support and the extension within the spring back of the support, offers considerable advantage in itself and also cooperates with the movement about the bracket.

It will be evident that my disclosure herein will suggest to others skilled in the art various ways in which all or part of the benefit of my invention may be secured without copying the structure illustrated and it is my purpose to cover herein all such modifications and changes as come within the spirit and scope of my invention.

Having thus described my invention what I claim as new and desire to secure by Letters Patent is:—

1. In a train pipe connecter, a connecter head having a rearwardly extending hollow support apertured at the side, a spring-pressed pipe terminal within the support adapted to connect with a train pipe through the side opening and to move back and forward within the body of the head and the support, an eye at the rear of the support, a spring surrounding the eye, a bracket with which the rear of the spring engages and a hook rod engageable with the bracket and eye and maintaining the spring in compression.

2. A bracket having a hemispherical concave rearwardly facing seat within the lower end thereof, a nut fitting within the seat, a hook rod threaded within the nut, a head, a rearwardly extending support rigid with the head, an eye at the rear of the support engaged by the hook rod and a spring surrounding the hook rod and holding the head extended with respect to the bracket.

EDWARD A. ROBINSON.